United States Patent [19]

Joseph

[11] Patent Number: 5,637,853
[45] Date of Patent: Jun. 10, 1997

[54] READING INDICIA BY ANALYSIS OF DIFFERENT LIGHT REFLECTING PORTIONS BASED ON SIGNAL-TO-NOISE RATIOS

[75] Inventor: Eugene Joseph, Port Jefferson Station, N.Y.

[73] Assignee: Symbol Technologies, Inc., Holtsville, N.Y.

[21] Appl. No.: 508,744

[22] Filed: Jul. 28, 1995

[51] Int. Cl.⁶ .................................................. G06K 7/10
[52] U.S. Cl. .................................... 235/462; 235/463
[58] Field of Search ................................. 235/462, 463, 235/470, 469, 467

[56] References Cited

U.S. PATENT DOCUMENTS 3,900,832  8/1975  Hanchett ............................ 235/462
5,103,080  4/1992  Markan ........................... 235/462 X
5,446,272  8/1995  Barken ............................. 235/462
5,461,223  10/1995  Butturini et al. ................ 235/463 X
5,536,927  7/1996  Butturini et al. ................ 235/463 X Primary Examiner—Donald T. Hajec
Assistant Examiner—Thien Minh Le
Attorney, Agent, or Firm—Kirschstein et al.

[57] ABSTRACT

A reader for reading a bar code symbol consisting of badly printed bars on a clean background generates a signal having portions corresponding to the different light reflectivities of the bars and the spaces. Those portions of the signal corresponding to the bars will include high frequency noise components owing to the badly printed bars whereas portions of the signal corresponding to the spaces will be noise-free. The information encoded in the bar code symbol can thus be recovered by identifying the noisy and noise-free portions of the signal.

10 Claims, 2 Drawing Sheets

READING INDICIA BY ANALYSIS OF DIFFERENT LIGHT REFLECTING PORTIONS BASED ON SIGNAL-TO-NOISE RATIOS

BACKGROUND OF THE INVENTION

1. Field of the Invention

This invention relates to an apparatus and method of reading indicia by analysis of noisy signals. In particular the invention relates to the reading of indicia having spaced apart regions of two different light reflectivities, such as bar code symbols.

2. Description of the Related Art

Various optical readers and optical scanning systems have been developed for reading indicia such as bar code symbols appearing on an article. The symbol itself is a coded pattern of indicia comprised of, for example, a series of bars of various widths spaced apart from one another so as to bound spaces of various widths, the bars and spaces having different light reflecting characteristics. The readers electro-optically transform the indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like.

Often the bar code symbol to be read is imperfectly printed, for example voids appear in the bars. Such defects in the printed symbols cause noise to appear in the electrical signals representing the symbols. Such problems arise, for example, where a badly printed indicia appears on a clean background. In such cases ink spread and voids may have been introduced during the printing process, for example when the indicia includes dot matrix printed symbols, as well as dirty or damaged symbols. Such ink spread and voids may lead to errors and inaccuracies in reading the indicia. In conventional readers for bar code symbols the bar code symbols are generally analyzed by examining the edges or transitions between bars and spaces, treating the bars and spaces as areas of differing light reflectivities. In some cases, however, such a technique is rendered less effective by imperfectly printed symbols which give rise to noise in the corresponding signal.

It is a general object to the present invention at least to alleviate some of the problems of the prior art.

It is a further object to provide a reader for reading printed indicia such as bar codes that provides improved reading of badly printed indicia.

It is yet a further object of the invention to provide a reader capable of reading at a high resolution.

It is a still further object of the invention to provide an improved method of reading indicia.

Additional objects, advantages and novel features of the present invention will become apparent to those skilled in the art from this disclosure, including the followed detailed description, as well as by practice of the invention. While the invention is described below with reference to preferred embodiments, it should be understood that the invention is not limited thereto. Those of ordinary skill in the art will recognize additional applications, modifications and embodiments in other fields which are within the scope of the invention as disclosed and claimed herein and with respect to which the invention could be of significant utility.

SUMMARY OF THE INVENTION

According to the invention there is provided a reader for reading indicia having regions of two different light reflectivities, such as bar code symbols, comprising:

an optical arrangement for focusing a light beam on the indicia to be read;

a sensor for detecting the light reflected off the indicia and for generating an electrical signal indicative of the detected light intensity; and means for distinguishing between the signal portion representing a region of first light reflectivity and a signal portion representing a region of second light reflectivity based upon the signal to noise ratios of each signal portion. Thus, when, for example, a bar code symbol is badly printed on a clean background surface the noisy portions of the corresponding signal will represent the dark bars and the noiseless portions of the signal will represent the clean, light background corresponding to the spaces between the bars. The bars and spaces are then easily identified by the means for distinguishing between the signal portions. The invention thus allows reading of badly printed indicia while still maintaining a high resolution.

According to the present invention there is further provided a method of reading indicia having regions of two different light reflectivities, such as bar code symbols, in which a reader includes an optical arrangement, a sensor and means for distinguishing between a signal portion representing a region of first light reflectivity and a signal portion representing a region of second light reflectivity, in which the optical arrangement focuses a light beam on the indicia to be read, the sensor detects the light reflected off the indicia and generates an electrical signal indicative of the detected light intensity and the signal is analyzed to distinguish between signal portions representing a region of first light reflectivity and signal portions representing a region of second light reflectivity based upon the signal-to-noise ratios of each signal portion.

According to the present invention there is further provided a reader for reading indicia having regions of two different light reflectivities, such as bar code symbols, comprising:

an optical arrangement for focusing a light beam on the indicia to be read;

a sensor for detecting the light reflected off the indicia and for generating an electrical signal indicative of the detected light intensity;

means for determining an estimated unit module width of elements of the indicia and means for identifying which of the regions of different light reflectivity is essentially noise-free.

Accordingly the invention allows improved reading of badly printed indicia whilst allowing a high resolution.

According to the invention there is further provided a method of reading bar code symbols consisting of bars and spaces in which the reader comprises an optical arrangement, a sensor for determining an estimated unit module width and means for identifying noise-free regions of the indicia in which the optical arrangement focuses a light beam on the indicia to be read, the sensor detects light reflected off the indicia and generates an electrical signal indicative of the detected light intensity, the unit module width of elements of the indicia is estimated and the noise-free regions of the indicia are identified.

The invention may be carried into practice in a number of ways, and several specific embodiments will now be described, by way of example, with reference to the drawings.

DETAILED DESCRIPTION OF THE PREFERRED EMBODIMENT

Figure 1:
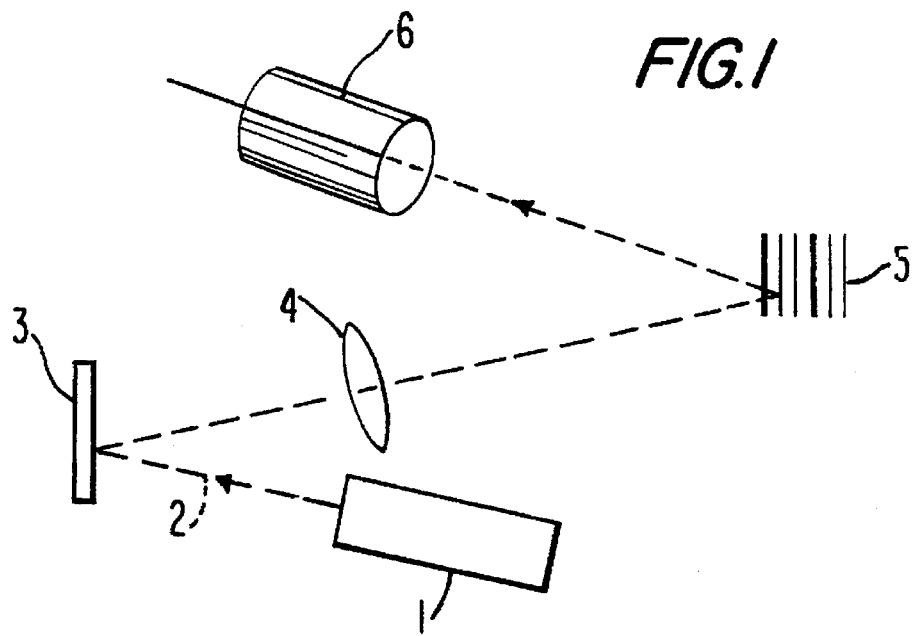
FIG. 1 is a schematic view of a reader for reading a bar code.

The reader shown in FIG. 1 comprises a light source 1 for generating a scanning light beam 2, a mirror 3 for directing the light beam 2 and a lens 4 for focusing the light beam on a target indicia 5 which, in the drawings, is a bar code symbol. A detector 6 detects light reflected from the target 5 and includes circuitry for generating an electrical symbol corresponding to the target. The mirror 3 is movably mounted and oscillates so as to direct the beam in a scanning pattern across the target 5. The detector 6 may be mounted on a same body as the light generating and directing means 1, 2, 3, 4 or may be provided separately, For example, the system could be comprised in a single hand-held module.

Figure 2:
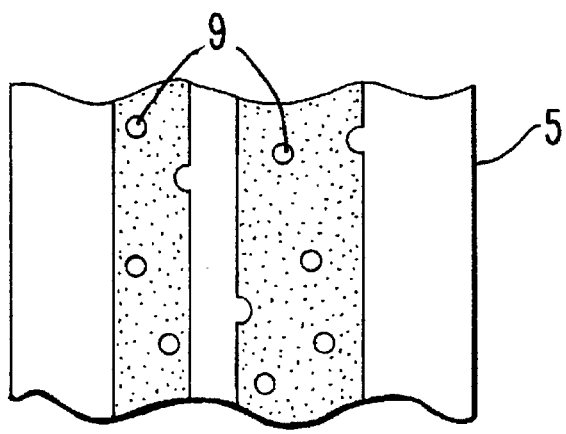
FIG. 2 shows a portion of a badly printed bar code.
Figure 3:
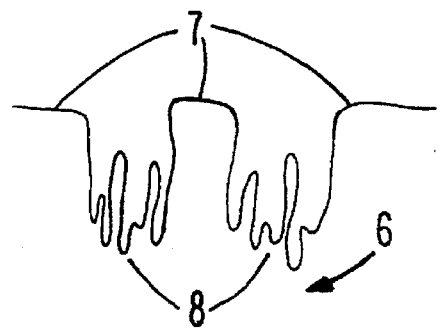
FIG. 3 shows the signal generated corresponding to the portion of a bar code shown in FIG. 2.

The detector 6 includes a circuit for producing a digital bar pulse signal, a digitized signal being produced corresponding to the variations in the level of reflectivity of the scanned target.

Where the bar code symbol has been badly printed for example by the dot matrix process on a clean background, such as the packaging of an item, the dark regions of the bar code symbol may include voids 9 as shown in FIG. 2. On the other hand, the clean background onto which the bar code symbol has been printed will not include any specks or other noise-producing elements and thus the spaces between the bars are effectively noise-free. As the light beam is scanned across the target 5 a signal 6 is generated as shown in FIG. 3. The signal 6 comprises two basic portions 7 and 8 corresponding to the light and dark portions respectively of the bar code 5. As can be seen, the relatively clean spaces give rise to a relatively noise-free signal portion 7 whereas the badly printed bar portions give rise to a noisy signal portion 8. Accordingly, in order to differentiate between the areas of differing light reflectivity within the bar code it is necessary merely to analyze the signal 6 to identify which portions are noiseless and which portions are noisy. A pulse width modulated signal can thus be obtained corresponding to the bars and spaces of the bar code symbol. The analysis may be carried out by a dedicated circuit or by digitizing the signal and using appropriate software.

Figure 5:
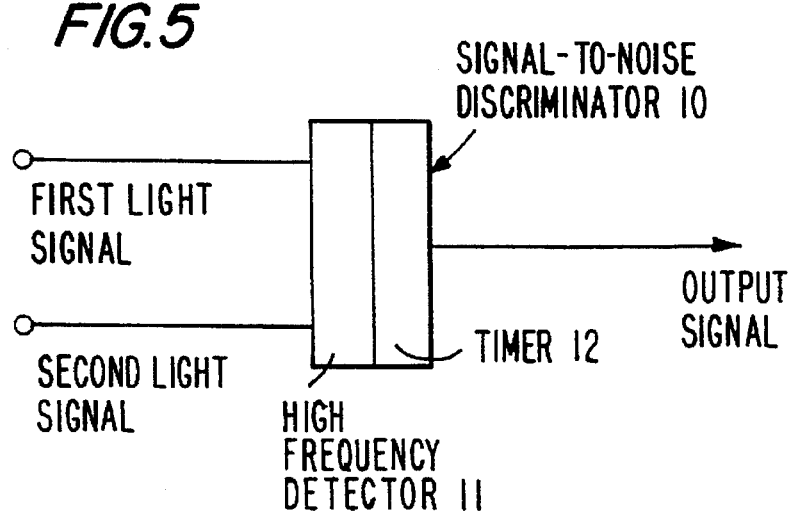
FIG. 5 is a block diagram of a circuit for distinguishing between signals based on their signal to noise ratios.

The basic circuitry required for analyzing the signal as described above would be easily assembled by the skilled man, The circuitry 10 shown in FIG. 5 would include a detector circuit 11 for detecting high frequency portions of the signal corresponding to the noisy portions of a signal, and a timing circuit 12 for detecting the duration of the noisy portions of the signal.

This approach differs substantially from the conventional approach, where a target is scanned and particular attention is paid to the transitional edge between areas of differing light reflectivity in that the variations in the corresponding signal are effectively examined through time. Accordingly the invention provides an improved approach to reading a noisy bar code symbol using analysis of the digital bar pulse signal.

Improved reading of badly printed indicia can also be obtained by taking into account the unit module width of elements of the indicia. In a perfectly printed bar code symbol the unit module width is the minimum possible width of a bar or space, and the width of all bars or spaces is a multiple of the unit module width.

Firstly the unit module width is estimated. Where the bar code symbol is imperfectly printed the unit width is of course difficult to determine. It is, however, possible to obtain a value of the unit module width without using a specialized decoder as follows:

1) Assume, as above, that the bar code symbol comprises badly printed bars on a clean background, the bar code symbol thus consisting of "noisy" bars and "noise-free" spaces. Experience indicates that that assumption is valid as the method of printing a foreground colour on a uniform background is a very common printing technique. 2) It has been observed that the average element size in a bar code symbol is between 1.3 and 1.8 modules. This moderate variance and average element size allows a coarse estimate of the unit module width to be made as follows:

Unit Module Width =0.6×Average Element Width.

The observed relationship between average element size and unit module width is valid for many commonly used bar code symbologies, for example code 39, interleaved 2 of 5, codabar code and UPC/EAN.

3) The unit module width is thus estimated by establishing the average element width and carrying out the above calculation.

It will be noted of course that the unit module value can be corrupted by noisy edges in the signal corresponding to imperfections in the bar code symbol, and to reduce the effect of the noise the above computation is only carried out in respect of "big edges", a big edge being an edge having a strength (given by a comparison of the reflectivities on either side of the edge) is greater than or equal to 30% of the "biggest edge" of the bar code symbol. Many small noisy edges are eliminated by this process.

Figure 4A:
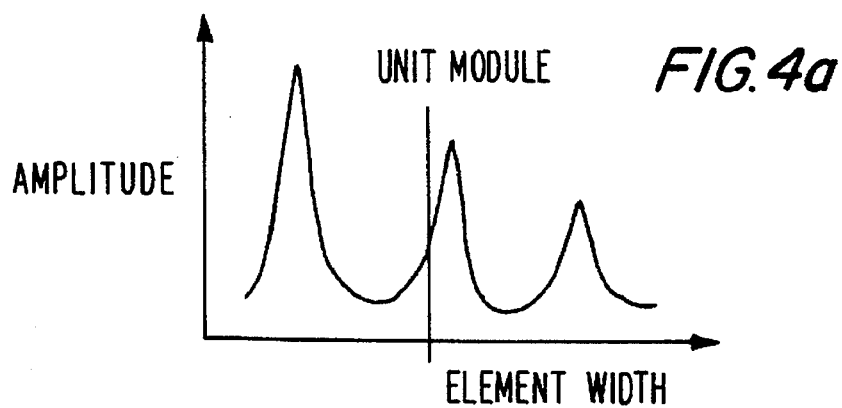
FIG. 4a is a histogram of noisy data.
Figure 4B:
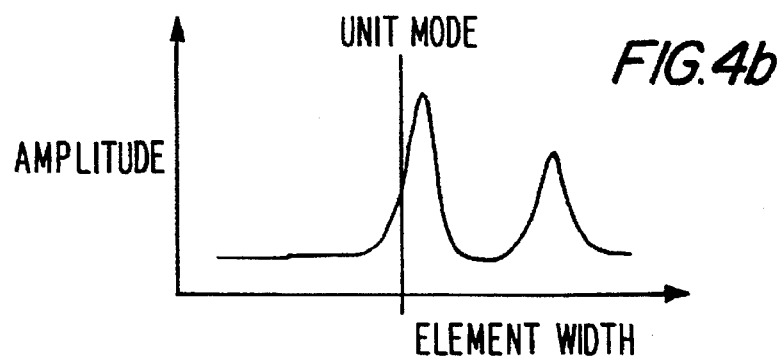
FIG. 4b is a histogram of noise-free data.

Once the unit module width has been estimated as described above it is then established whether the spaces or the bars of the region 3 are free of printing noise, as follows:

FIGS. 4a and 4b show histograms giving the frequency of elements of various widths. FIG. 4a shows the histogram obtained when a noisy bar code symbol is analyzed and FIG. 4b shows the histogram obtained when a noise-free bar code symbol is analyzed. As can be seen, the noise gives rise to an additional high peak in FIG. 4a. As can be seen, the unit module width falls to the left of the first true peak on the histogram when the noisy peak has been identified.

The histograms can be used to establish whether it is the bars or the spaces that are noise-free. Where, for example, the spaces are noise-free all real spaces will be represented in the histogram together with extra spaces that are detected but are in fact due to the break-up of bars. Similarly, on the bar histogram some real bars will be lost because of the break-up process and it will be seen that in the bar histogram the noise has the effect of causing a migration from wide elements to narrower elements. Comparing the bar and space histograms, therefore, the sum of elements in the upper half of the space histogram should be greater than that for the bar histogram and the part of the histograms to the right of the unit module width can be used to determine whether the bars or the spaces are noise-free.

Assuming that the spaces of the regions are free of printing noise, all spaces that are at least one module wide are now located: the edges bounding the spaces are valid edges of the bar code. In addition, the bars interleaved between the spaces can be analyzed to ensure that they are also at least one module wide.

Accordingly a small spot size can be used to scan the bar code symbol allowing a higher density symbol to be decoded.

Furthermore, once the unit module width has been identified, bars and spaces having a width which is not a multiple of the unit module width because of, for example, errors in the printing can be identified and their width normalized.

An appropriate algorithm for analyzing a bar code symbol and removing noise is as follows:

```
Comments: A space is a negative (-ve) edge followed by a
    positive (+ve) edge.
    A bar is a positive (+ve) edge followed by a negative
    (-ve) edge.
    Assume that the spaces are noise free.
Input: A list of edges, a left margin, a right margin.
Output: A list of edges with most of the noise removed.
Remove_noise ()
{
    unit_module = estimate_unit_module();
    delta = 0.6* unit_module;
    Output(+ve_edge_at_left_margin);
    current_space = get_next_space();
    previous_space = distance(left_margin,current_space);
    while (left_edge(current_space = get_next_space()) <
    right_margin)
    {
        if ((width_of(current_space) > delta) &&
        (distance(previous_space, current_space) > delta))
        {
            Output (left_edge(current_space));
            Output (right_edge(current space));
            previous_space = current_space;
        }
    }
Output (left_edge(current_space));
}
```

It will be appreciated that, while the above discussion has been limited to bar code symbols, any other appropriate indicia can be read using the general principles set out above.

It will further be appreciated that, whilst the above discussion has been limited to an optical scanning system a static system (field of view) incorporating a CCD detector could equally be used.

The bar code symbol can thus be read effectively ignoring printing noise on the bars.

I claim:

1. A reader for reading indicia having regions of two different light reflectivities, comprising:

an optical arrangement for focusing a light beam on the indicia to be read;

a sensor for detecting the light reflected off the indicia and for generating an electrical signal indicative of the detected light intensity; and means for distinguishing between a signal portion representing a region of first light reflectivity and a signal portion representing a region of second light reflectivity based upon the signal-to-noise ratios of each signal portion.

2. A reader as claimed in claim 1 in which the means for distinguishing between the signal portions comprises an electronic circuit.

3. A reader as claimed in claim 1 in which the means for distinguishing between the signal portions distinguishes between noisy portions and noise-free portions.

4. A reader as claimed in claim 1 in which the optical arrangement comprises a flying spot scanner.

5. A reader as claimed in claim 1 in which the optical arrangement comprises a field of view optical system.

6. A reader as claimed in claim 1 in which the means for distinguishing between the signal portions provides a pulse width modulated signal representing the indicia.

7. A method of reading indicia having regions of two different light reflectivities, in which a reader includes an optical arrangement, a sensor and means for distinguishing between a signal portion representing a region of first light reflectivity and a signal portion representing a region of second light reflectivity, in which the optical arrangement focuses a light beam on the indicia to be read, the sensor detects the light reflected off the indicia and generates an electrical signal indicative of the detected light intensity and the signal is analyzed to distinguish between signal portions representing a region of first light reflectivity and signal portions representing a region of second light reflectivity based upon the signal-to-noise ratios of each signal portion.

8. A method as claimed in claim 7 in which the signal is analyzed to distinguish between noisy signal portions and noise-free signal portions.

9. In a system for electro-optically reading indicia having regions of two different light reflectivities by scanning the regions with light, and by detecting the light reflected off the regions and generating an electrical signal having portions indicative of the detected light, a circuit for improving reading accuracy in the presence of defects in one of said light-reflective regions, said defects introducing electrical noise into one of the portions of the electrical signal that leads to reading errors, said circuit comprising:

means for detecting which portion of the electrical signal contains the electrical noise, thereby identifying said one light-reflective region;

means for detecting which portion of the electrical signal is free of the electrical noise, thereby identifying the other of the light-reflective regions; and means for determining the duration of each detected portion of the electrical signal, thereby obtaining an output electrical signal corresponding to the indicia being read.

10. A circuit as claimed in claim 9 in which the means for detecting the signal portion containing the electrical noise includes circuitry for detecting high frequency signals.

* * * * *